United States Patent [19]

Lauck

[11] 4,060,675

[45] Nov. 29, 1977

[54] GALVANIC ELEMENT WITH A NEGATIVE ELECTRODE OF LIGHT METAL, A NON-AQUEOUS ELECTROLYTE AND A POSITIVE ELECTRODE

[75] Inventor: Helmut Lauck, Glashutten, Germany

[73] Assignee: Varta Batterie Aktiengesellschaft, Hannover, Germany

[21] Appl. No.: 664,544

[22] Filed: Mar. 8, 1976

[30] Foreign Application Priority Data

Apr. 16, 1975 Germany .............................. 2516702

[51] Int. Cl.² .............................................. H01M 6/14
[52] U.S. Cl. .................................... 429/194; 429/219;
429/220; 429/223; 429/225

[58] Field of Search .............. 136/6 LN, 100 R, 83 R,
136/83 T, 6 LF, 137; 429/194–198, 218, 219,
220, 223, 225, 226

[56] References Cited

U.S. PATENT DOCUMENTS

| 3,736,184 | 5/1973 | Dey et al. .......................... 136/137 X |
| 3,918,988 | 11/1975 | Abens .......................... 136/100 R X |

Primary Examiner—Charles F. LeFevour
Attorney, Agent, or Firm—Herbert L. Lerner

[57] ABSTRACT

Galvanic element with a negative electrode of a light metal, a non-aqueous electrolyte and a positive electrode containing arsenites, particularly silver and mercury arsenites, as the electrochemical reducible part of the electrode mass. The use of arsenites exhibit an especially high energy density and a very constant discharge potential during operation.

9 Claims, 1 Drawing Figure

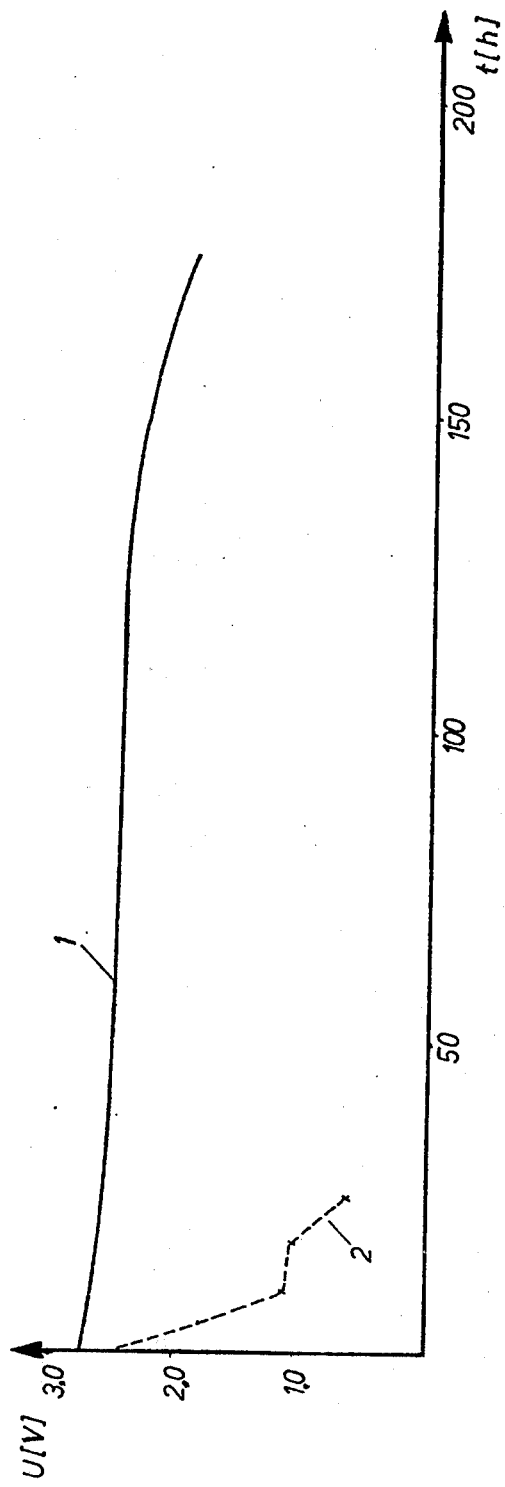

GALVANIC ELEMENT WITH A NEGATIVE ELECTRODE OF LIGHT METAL, A NON-AQUEOUS ELECTROLYTE AND A POSITIVE ELECTRODE

This invention relates to a galvanic element and more particularly refers to a new and improved galvanic cell with a negative electrode of a light metal, a non-aqueous electrolyte and a positive electrode.

In cells of this type, light metals, because of their low equivalent weights and their high standard potentials, have a specially high energy density as electrode materials for galvanic cells. For this reason, lithium is especially well suited as material for electrodes.

On the one hand, the high chemical reactivity of the light metals requires the use of a non-aqueous electrolyte. On the other hand the choice of a material for the positive electrode poses special problems. Most materials are too easily dissolved in the electrolytes, whereby the usable capacity of such an electrode is greatly reduced during storage. In other materials, the chemical reaction which generates electric current is so weak, that a discharge with higher current densities is not possible.

For example, U.S. Pat. No. 3,736,184 relates to galvanic cells with negative electrodes made of light metal, an electrolyte consisting of ion-forming light metal salts dissolved in an organic solvent and positive electrode materials of phosphates and arsenates. The use of phosphates and arsenates, particularly silver arsenates, as electro-chemically reducible material of the active mass has many disadvantages.

The electro-chemical active mass of the positive electrode is only used up to 70%. Thereby, valuable raw materials are wasted. Because of the relative low voltage, cells of this kind have only a low energy density. Cells of this kind cannot be used for the current supply of highly sensitive electronic apparatus which needs a constant voltage power supply. At a load with defined constant current density the cell voltage decreases not uniformly with the time and in steps.

An object of the present invention is to provide a galvanic element which exhibit high energy density and the electro-chemical active mass can be used to a great extent for the current generating reaction. Another object of the invention is to provide galvanic cells which exhibit an almost constant voltage during the total discharge time to permit their use in sensitive electronic apparatus.

In accordance with the present invention is provided a galvanic element with a negative electrode of a light metal, a non aqueous electrolyte and a positive electrode containing arsenites as the electro-chemical reducible part of the positive electrode mass.

Thus by means of the invention in which the electochemically reducible part of the positive electrode mass consists of arsenites are attained beneficial results. The use of arsenites has many advantages. They exhibit a very high energy density with respect to electro-chemical reactions, combined with a very high discharge potential.

Arsenites of the metals silver, mercury, copper, lead and nickel are well suited as positive electrode material. Particularly, silver and mercury arsenites excel by an especially high energy density and a very constant discharge potential (voltage) during operation.

As negative electrode, possible choices are: lithium, calcium, magnesium and aluminum. Because of its very high standard potential, lithium is especially suited for cells with high energy density.

Other features which are considered as characteristic for the invention are set forth in the appended claims.

Although the invention is illustrated and described herein as embodied in galvanic element with a negative electrode of light metal, a non-aqueous electrolyte and a positive electrode, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

For the manufacture of the positive electrode, a mass is made mixed of 93 weight % to 97 weight %, preferably approximately 95 weight % of arsenites, with 3 weight % to 5 weight %, preferably approximately 4 weight % of an electronic conducting material, particularly graphite and between 0,8 and 1.2 weight %, preferably approximately 1 weight % of a binding agent, such as polytetrafluoroethylene and which mass may, for example, be pressed into the shape of an electrode tablet. This tablet can be pressed into the base of a button-type cell. Also, it is possible to wrap this tablet with a nickel net for better electric contact, i.e. provide better conduction. Furthermore, it can be advantageous to soak the electrode mass, respectively the electrode tablet with an electrolyte to assure the extensive use of the active mass.

The following composition may be employed as electrolyte:

1 to 1.4 molar, preferably 1.2 molar solutions of a conducting salt, particularly lithium perchlorate (LiClO$_4$), in an organic solvent which does not set free H+-ions.

A preferred solvent is composed of a mixture of 25 to 35 vol % of propylene carbonate, 30 to 40 vol % tetrahydrofuran and 30 to 40 vol % 1,2-dimethoxyethane, with the individual components of the solvent desirably in a volume ration of approximately 30:35:35.

Another suitable solvent is a mixture of 40 to 60 vol % propylenecarbonate with 40 to 60 vol % 1,2-dimethoxyethane, preferably in the volume ratio of approximately 101.

For the negative electrode an approximately 1.5 mm thick lithium sheet is used, which, in some cases, may be pressed into a piece of metal mesh which is secured to the inner side of the cell cover by spot welding .

Between the negative and positive electrode is disposed an approximately 1 mm thick separator made of a glass fiber layer which is soaked with electrolyte.

In the accompanying FIGURE, curve 1 shows the behavior during discharge of a cell in accordance with the invention, with a negative lithium electrode and a positive electrode of silver arsenite (Ag$_3$AsO$_3$) and an approximately 1.2 molar solution of lithium perchlorate in a mixture of propylene carbonate, tetrahydrofuran and 1,2-dimethoxyethane in a volume ratio of approximately 30:35:35 as electrolyte at room temperature and a current density of 1 mA/cm$^2$. The cell voltage U remains nearly constant during the total discharge time.

In contrast, curve 2 of the FIGURE shows the behavior during discharge of a cell according to U.S. Pat. No 3,736,184 with a positive electrode of silver arsenate (Ag$_3$AsO$_4$). The steep decrease of the potential (voltage) at constant discharge current density of 1 mA/cm$^2$ is clearly recognizable. This kind of cell is therefore not suitable for fine instruments. In contrast to this, a cell made according to the invention shows a constant discharge voltage.

Cells made according to the invention are outstanding by their high energy density and capability to be stored for a long time. They can be operated with high current density loads and exhibit a nearly constant discharge voltage during the total discharge time and approximately 95% of the electrochemically reducible part of the positive electrode mass is utilized for the current generating reaction.

There are claimed:

1. In a galvanic element with a negative electrode of a light metal, a non-aqueous electrolyte of a solution of a conducting salt in an organic solvent which does not set free H+-ions and a positive electrode containing a salt of a metal selected from the group consisting of silver, mercury, copper, lead and nickel, the improvement comprising said salt being an arsenite as the electrochemical reducible part of the positive electrode mass.

2. Galvanic element according to claim 1 wherein said positive electrode contains silver arsenite as the electro-chemical reducible part of the positive electrode mass.

3. Galvanic element according to claim 1 wherein said positive electrode contains mercury arsenite as the electro-chemical reducible part of the positive electrode mass.

4. Galvanic element according to claim 1 wherein the negative electrode is lithium.

5. Galvanic element according the claim 1 wherein the electrolyte is composed of a 1 to 1.4 molar solution of lithium perchlorate in a mixture of 25 to 35 volume percent of propylene carbonate, 30 to 40 volume percent of tetrahydrofuran and 30 to 40 volumne percent of 1,2-dimethoxyethane.

6. Galvanic element according to claim 1 wherein the electrolyte is composed of a 1 to 1.4 molar solution of lithium perchlorate in a mixture of 40 to 60 volume percent of propylene carbonate and 40 to 60 volume percent of 1,2-dimethoxyethane.

7. Galvanic element according to claim 1 wherein said positive electrode contains 93 to about 97 percent by weight arsenites, and in fine distribution 3 to 5 percent by weight graphite and 0.8 to 1.2 percent by weight polytetrafluoroethylene.

8. Galvanic element according to claim 2 wherein the negative electrode is lithium.

9. Galvanic element according to claim 3 wherein the negative electrode is lithium.

* * * * *